(12) United States Patent
Lechkun et al.

(10) Patent No.: US 7,455,342 B2
(45) Date of Patent: Nov. 25, 2008

(54) STOWABLE OTTOMAN FOR A VEHICLE PASSENGER CABIN

(75) Inventors: David M. Lechkun, Shelby Township, MI (US); Brian Izard, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 395 days.

(21) Appl. No.: 11/306,687

(22) Filed: Jan. 6, 2006

(65) Prior Publication Data

US 2008/0007091 A1 Jan. 10, 2008

Related U.S. Application Data

(60) Provisional application No. 60/753,742, filed on Dec. 23, 2005.

(51) Int. Cl.
*B60N 3/06* (2006.01)

(52) U.S. Cl. .................... 296/64; 296/65.05; 296/75

(58) Field of Classification Search .................. 296/75, 296/64, 65.01, 65.05, 65.09, 65.13, 65.14, 296/69; 297/15, 423.1, 423.26, 423.27, 423.28, 297/423.44
See application file for complete search history.

(56) References Cited

U.S. PATENT DOCUMENTS

| 1,218,006 | A | * | 3/1917 | Schramm ................. 296/66 |
|---|---|---|---|---|
| 1,487,495 | A | * | 3/1924 | Von Germeten et al. ...... 296/75 |
| 1,496,569 | A | * | 6/1924 | Von Germeten et al. ...... 296/75 |
| 1,590,382 | A | * | 6/1926 | King ............................ 296/75 |
| 2,032,157 | A | * | 2/1936 | Dresser et al. ................ 296/75 |
| 2,202,857 | A | * | 6/1940 | Jacobs ......................... 296/75 |
| 3,184,766 | A | * | 5/1965 | Mortrude ...................... 5/118 |
| 4,957,321 | A | | 9/1990 | Martin et al. |
| 5,183,308 | A | * | 2/1993 | Koga et al. .................... 296/75 |
| 5,195,795 | A | * | 3/1993 | Cannera et al. .......... 296/65.09 |
| 5,570,931 | A | | 11/1996 | Kargilis et al. |
| 5,839,773 | A | | 11/1998 | Ban et al. |
| 5,979,964 | A | * | 11/1999 | Ban et al. ..................... 296/66 |
| 6,318,696 | B1 | * | 11/2001 | Downey et al. ............. 248/430 |
| 6,527,327 | B2 | * | 3/2003 | Gaus et al. .................... 296/75 |
| 6,793,265 | B2 | * | 9/2004 | Kamida et al. ................ 296/64 |
| 6,932,424 | B2 | * | 8/2005 | Rhodes et al. ................ 297/15 |
| 6,997,498 | B2 | * | 2/2006 | Oyama ..................... 296/65.05 |
| 7,066,519 | B2 | * | 6/2006 | Rhodes et al. ............ 296/37.14 |
| 7,108,323 | B2 | * | 9/2006 | Welch et al. .............. 297/284.9 |
| 7,128,358 | B2 | * | 10/2006 | Perin ........................ 296/65.09 |
| 2004/0100130 | A1 | * | 5/2004 | Rhodes et al. ................ 297/15 |

* cited by examiner

*Primary Examiner*—Glenn Dayoan
*Assistant Examiner*—Gregory Blankenship
(74) *Attorney, Agent, or Firm*—Dickinson Wright PLLC; Greg Brown

(57) ABSTRACT

A passenger cabin for a vehicle. The passenger cabin is comprised of a floor panel, a first row seat, a second row seat, and a stowable ottoman. The first row seat and the second row seat are attached to the floor panel. The stowable ottoman is pivotally attached to the floor panel between the first row seat and the second row seat. The stowable ottoman is deployable from underneath the floor panel through an opening in the floor panel.

11 Claims, 6 Drawing Sheets

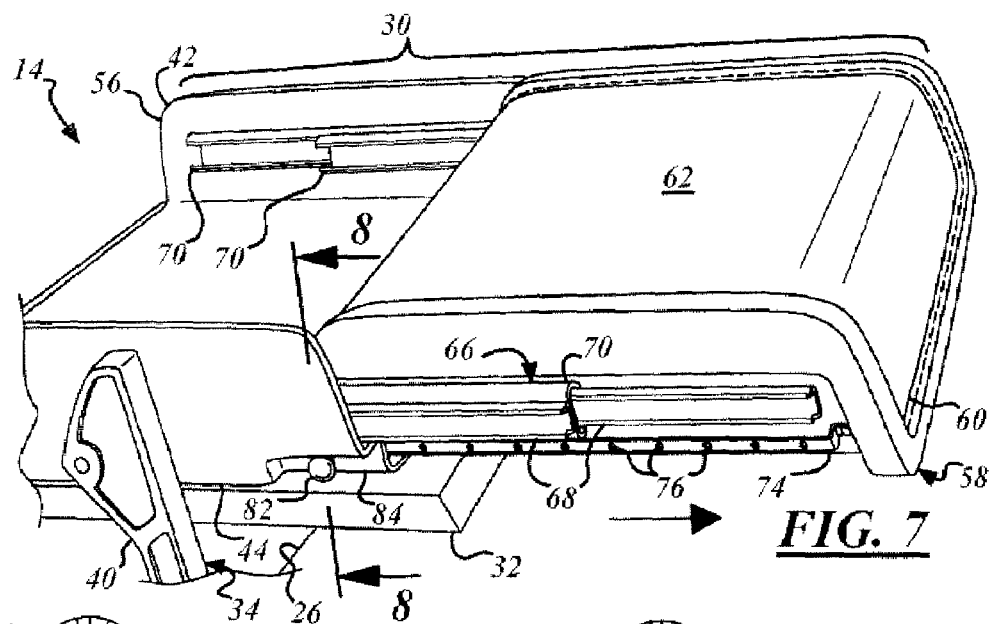
FIG. 7
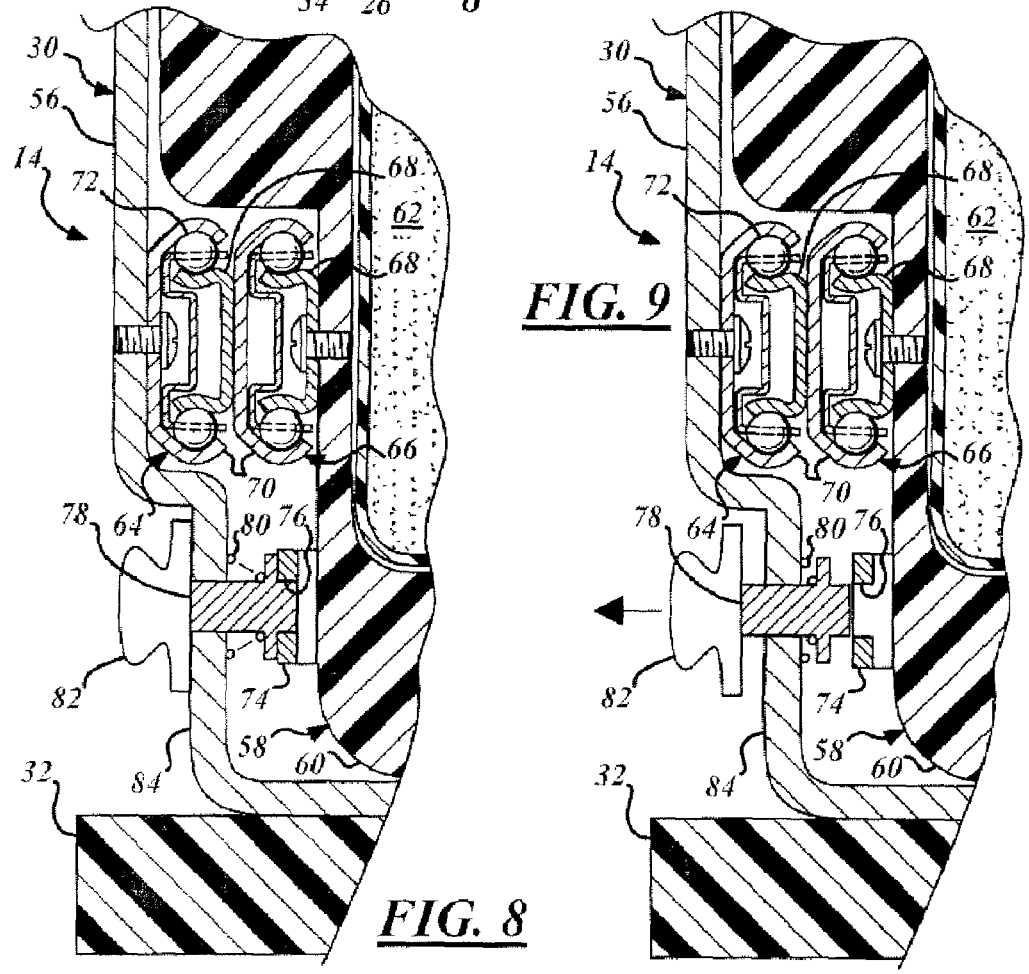
FIG. 9
FIG. 8

STOWABLE OTTOMAN FOR A VEHICLE PASSENGER CABIN

CROSS-REFERENCE TO RELATED APPLICATIONS

This application claims priority to U.S. Provisional Application Ser. No. 60/753742 entitled "Automotive Vehicle with Various Utility and Comfort Features" filed on Dec. 23, 2005, the disclosure of which is incorporated by reference herein.

TECHNICAL FIELD

The present invention relates generally to vehicle passenger cabins, and particularly to a stowable ottoman for enhancing the comfort of vehicle passengers.

BACKGROUND

Automotive manufacturers continuously develop features for improving the comfort of vehicle passengers. In particular, it is well known that large-sized vehicles can provide significant leg room for passengers. Also, one known vehicle seat includes a thigh bolster or extended seatbottom for supporting the lower thighs of somewhat tall passengers. However, the extended seatbottom can somewhat interfere with the ingress and egress of passengers from the vehicle. In addition, the seat typically does not elevate the passenger's lower legs. It is understood that elevating a passenger's legs can significantly assist the passenger in relaxing, particularly over a long period of travel. Furthermore, elevating the passenger's legs can also alleviate or even prevent circulatory problems typically associated with a passenger who remains seated over an extended length of time.

It would therefore be desirable to provide a stowable ottoman that increases the comfort of vehicle passengers, improves circulation of blood for the passengers, and does not interfere with ingress and egress of passengers from the vehicle.

SUMMARY OF THE INVENTION

A passenger cabin for a vehicle is provided. The passenger cabin is comprised of a floor panel, a first row seat, a second row seat, and a stowable ottoman. The first row seat and the second row seat are attached to the floor panel. The stowable ottoman is pivotally attached to the floor panel between the first row seat and the second row seat. The stowable ottoman is deployable from underneath the floor panel through an opening in the floor panel.

A stowable ottoman for a vehicle is provided. The stowable ottoman is comprised of a cushion member, a cover panel, and a linkage assembly. The cushion member is pivotally attached to the vehicle by the linkage assembly. This linkage assembly deploys the cushion member from underneath a floor panel for the vehicle. Also, the cushion member has the cover panel attached thereto. The cover panel is moved to a substantially flush position with the floor panel and conceals the cushion member.

One advantage of the present invention is that a stowable ottoman is provided that elevates a passenger's legs and increases his or her comfort.

Another advantage of the present invention is that a stowable ottoman is provided that alleviates or prevents circulatory problems that can be associated with a person who remains seated over a long period of time.

Yet another advantage of the present invention is that a stowable ottoman is provided that facilitates the ingress and egress from the vehicle.

Other advantages of the present invention will become apparent upon considering the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of the examples of the invention:

FIG. 7 is an enlarged view of the stowable ottoman shown in FIG. 4 and encircled by circle 6.

FIG. 8 is a cross-sectional view of the stowable ottoman shown in FIG. 7, illustrating the ottoman in a locked position.

FIG. 9 is a cross-sectional view of the stowable ottoman shown in FIG. 7, illustrating the ottoman in an unlocked position.

DETAILED DESCRIPTION OF THE INVENTION

Figure 1:
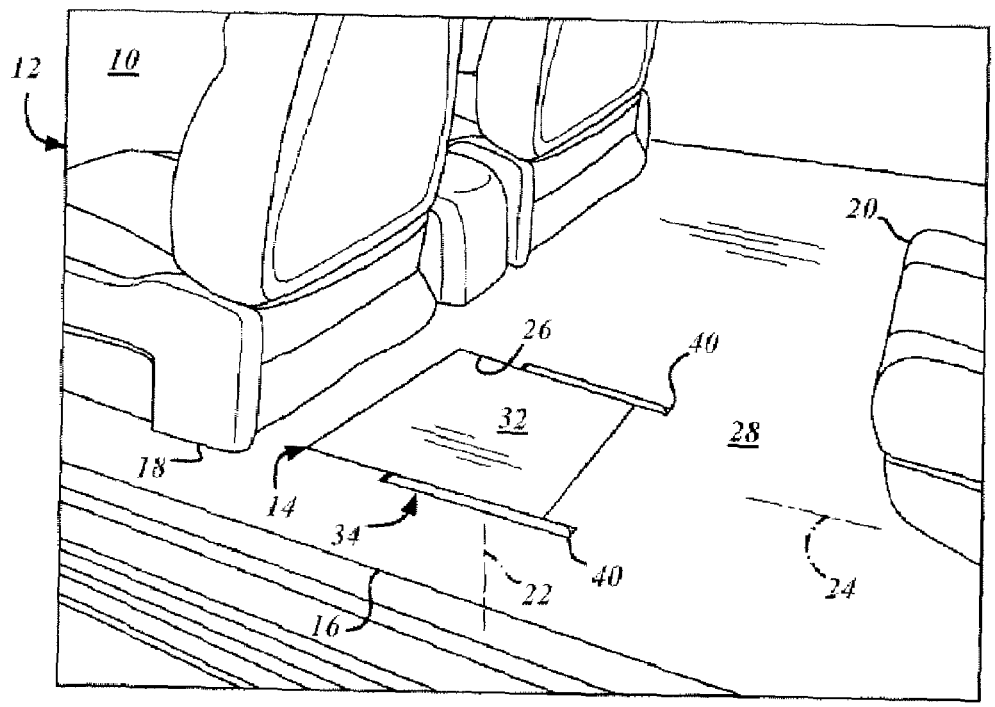
FIG. 1 is a perspective view of a passenger cabin for a vehicle with a stowable ottoman, illustrating the ottoman in a stowed position, according to one advantageous embodiment of the claimed invention.
Figure 2:
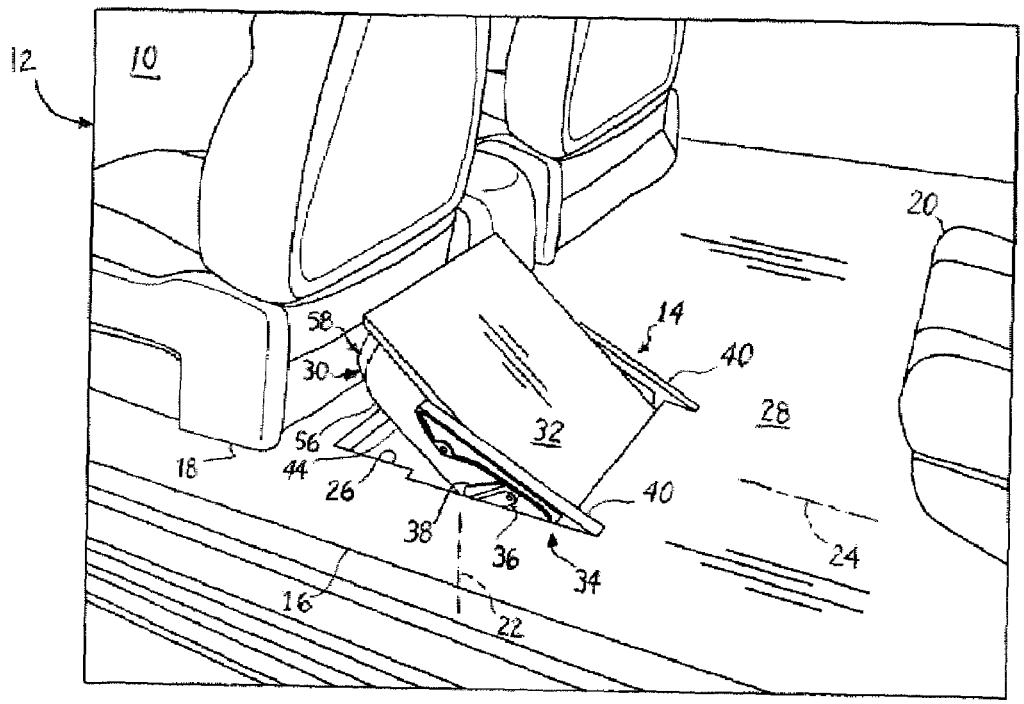
FIG. 2 is a perspective view of the passenger cabin shown in FIG. 1, illustrating the ottoman in a partially deployed position.

In the following figures, the same reference numerals are used to identify the same components in the various views.

The present invention is particularly suited for a stowable ottoman for a rear seat passenger. In this way, the embodiments described herein employ structural features where the context permits. However, various other embodiments are contemplated having different combinations of the described features, having features other than those described herein, or lacking one or more of those features. For example, the present invention can instead be suited for a stowable vehicle seat that fully deploys to a position directly above its stowed position underneath a floor panel. It is therefore contemplated that the invention can be carried out in a variety of other modes and utilized for other suitable applications as desired.

Referring to FIGS. 1 through 4, there are shown perspective views of a passenger cabin 10 for a vehicle 12 with a stowable ottoman 14 ("ottoman"), according to one embodiment of the invention. The passenger cabin 10 includes a floor panel 16, a first row seat 18, a second row seat 20, and the ottoman 14. The first row seat 18 and the second row seat 20 are attached to the floor panel 16. The ottoman 14 is pivotally attached to the vehicle 12 between the first row seat 18 and the second row seat 20.

FIGS. 1 through 4 respectively illustrate the ottoman 14 in a stowed position, a partially deployed position, a forward deployed position, and a rearward deployed position.

With attention to FIG. 1, the ottoman 14 in the stowed position is located underneath the floor panel 16 for facilitating the ingress and egress from the vehicle 12. In addition, the stowed ottoman 14 increases the cargo carrying capacity for the vehicle 12.

Figures 3, 4:
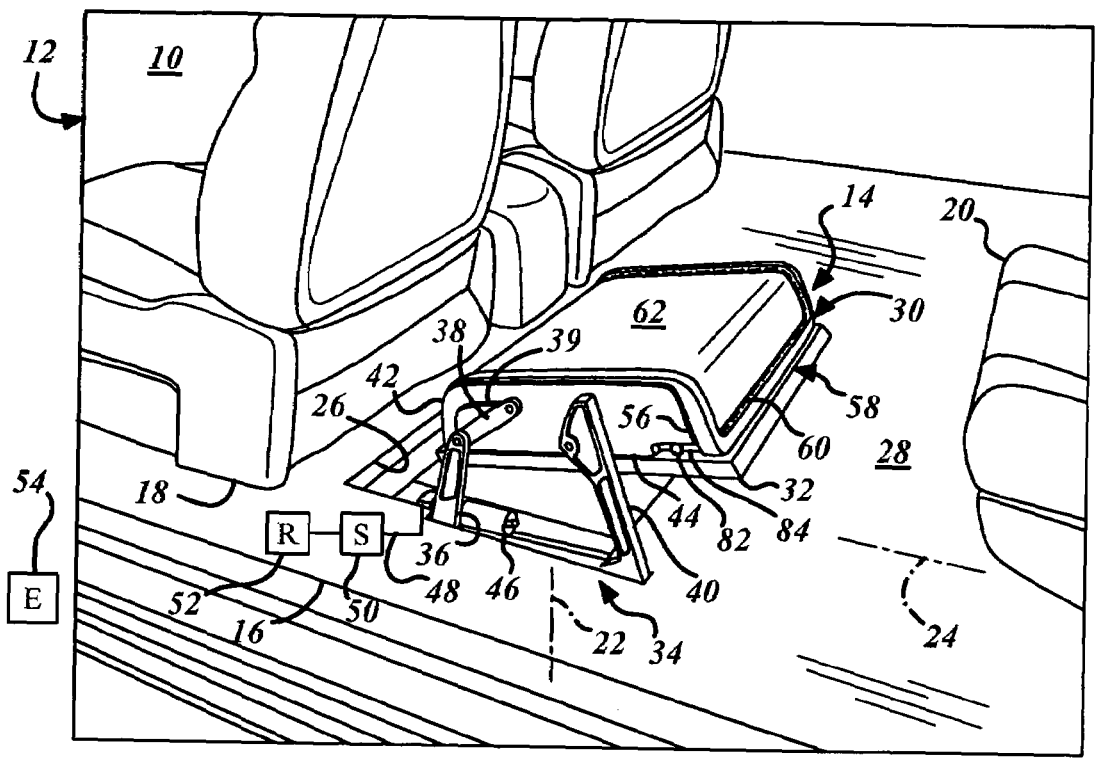
FIG. 3 is a perspective view of the passenger cabin shown in FIG. 1, illustrating the ottoman in a forward deployed position.
FIG. 4 is a perspective view of the passenger cabin shown in FIG. 1, illustrating the ottoman in a rearward deployed position.

As shown in FIG. 3, the ottoman 14 in the forward deployed position is located a predetermined distance forward of the second row seat 20 and thus supports the legs of an average sized adult.

Referring to FIG. 4, the ottoman 14 in the rearward deployed position is located closer to the second row seat 20 and can therefore support the legs of children or otherwise shorter individuals. Accordingly, the ottoman provides a variety of passengers with the comfort of resting his or her legs upon the ottoman 14 during travel of the vehicle 12.

As detailed below, the ottoman 14 is movable along a vertical axis 22 of the vehicle 12 between the stowed position (shown in FIG. 1) and the forward deployed position (shown in FIG. 3). Also, in this embodiment, the ottoman 14 is movable rearward along a longitudinal axis 24 of the vehicle 12 between the forward deployed position and the rearward deployed position (shown in FIG. 4).

The floor panel 16 defines an opening 16 through which the ottoman 14 is deployed and stowed. In particular, in the stowed position, the ottoman 14 is disposed below a top surface 18 of the floor panel 16 and within the opening 16. In the forward deployed position, the ottoman 14 is located directly above the opening 16 in the floor panel 16. Accordingly, the ottoman 14 is fully deployed without moving forward or rearward in the vehicle 12 along the longitudinal axis 24. This feature is beneficial for a passenger cabin 10 having first and second row seats that are positioned substantially close to each other.

In this embodiment, the ottoman 14 is comprised of a cushion member 30, a cover panel 32, and a linkage assembly 34.

The cushion member 30 is attached to a cover panel 32. As shown in FIG. 1, the cover panel 32 in the stowed position is disposed within the opening 16 and is substantially flush with the floor panel 16. To that end, the cover panel 32 conceals the cushion member 30 beneath the opening 16 in the floor panel 16.

In this embodiment, the cover panel 32 has a flat construction and is planar with the floor panel 16. However, the cover panel 32 can have other suitable constructions and be otherwise located in the stowed position as desired. As detailed below, the linkage assembly 34 rotates the cushion member 30 and the cover panel 32 so as to move the cushion member 30 above the cover panel 32 in the first and second deployed positions. In that way, the cushion member 30 is positioned for supporting a passenger's legs.

The linkage assembly 34 pivotally attaches the cushion member 30 to the vehicle 12 and moves the cushion member 30 substantially along the vertical axis 22 of the vehicle 12. As best shown in FIGS. 5 and 6, the linkage assembly is comprised of a pair of primary linkages 36, a pair of intermediate linkages 38, and a pair of idler linkages 40.

The primary linkages 36 are pivotally attached to the vehicle 12 beneath the top surface 18 of the floor panel 16. The primary linkages 36 are also pivotally attached to a front end portion 42 of the cushion member 30 by the intermediate linkages 38.

The idler linkages 40 are pivotally attached to the vehicle 12 beneath the top surface 18 of the floor panel 16. The idler linkages 40 are also pivotally attached to a rear end portion 44 of the cushion member 30. Further, in this embodiment, the idler linkages 40 are pivotally attached to the primary linkages 36 by a pair of cross bar linkages 41.

In the stowed position (shown in FIGS. 1 and 2), the primary and intermediate linkages 36, 38 are substantially retracted into the opening 16 and are collapsed adjacent to each other beneath the floor panel 16. Also, in the stowed position, the primary and intermediate linkages 36, 38 are beneath and concealed by the idler linkages 40 with the idler linkages 40 substantially flush with the floor panel 16 and the cover panel 32.

In the forward deployed position (shown in FIG. 3), the linkages 36, 38, and 40 are extended directly above the opening 16.

In this embodiment, one of the primary linkages 36 is pivoted by an electric motor 46 (shown in FIGS. 3 and 4) that is attached to the vehicle 12 beneath the top surface 18 of the floor panel 16. However, it is contemplated that the primary linkages 36 can instead be pivoted by various other suitable motors. Also, it will be appreciated that the motor 46 can pivot the idler linkages 40 rather than the primary linkages 36.

The electric motor 46 is supplied with power by a circuit 48 having a switch 50. The switch 50 is coupled to a receiver 52, which receives a signal from an emitter 54, e.g. a key fob. Upon receiving the signal, the receiver 52 closes the switch 50. Thus, the ottoman 14 can be remotely operated for deploying or stowing in the floor panel 16. However, the motor 46 can instead be manually operated by mechanical switches in the vehicle 12 as desired.

Figure 5A:
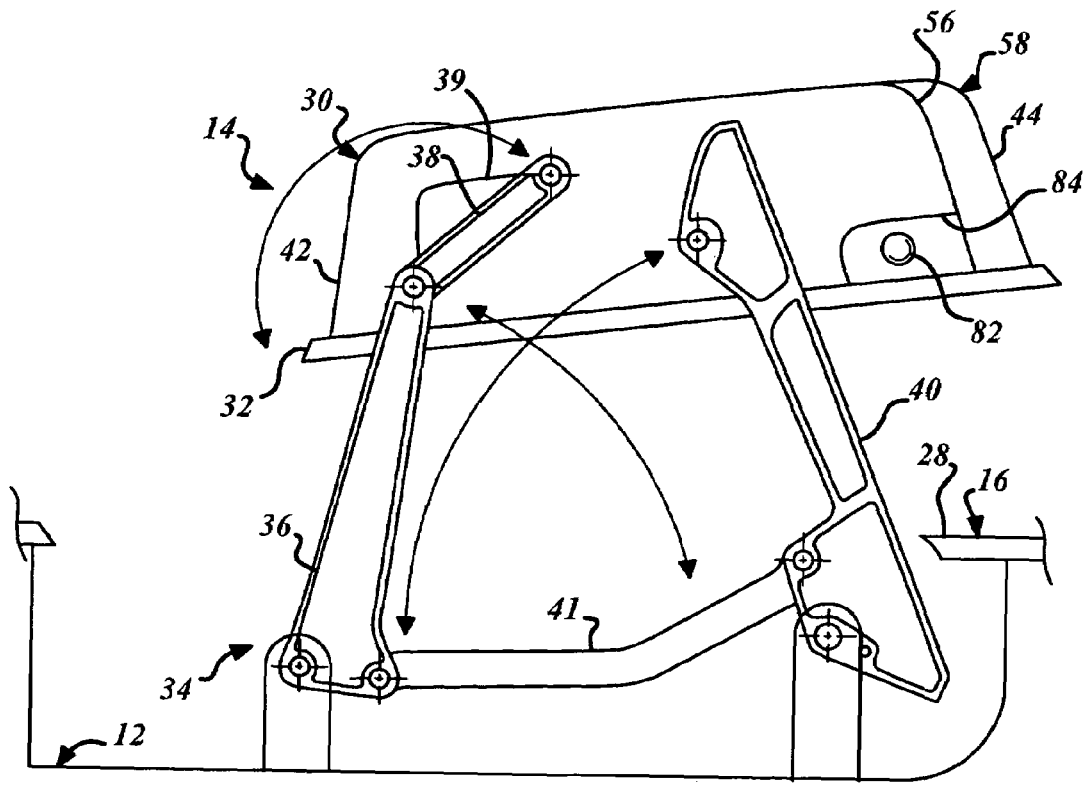
FIGS. 5A and 5B are side plan views of the ottoman shown in FIGS. 1 through 4, respectively illustrating the ottoman in a forward deployed position and a stowed position.
Figure 5B:
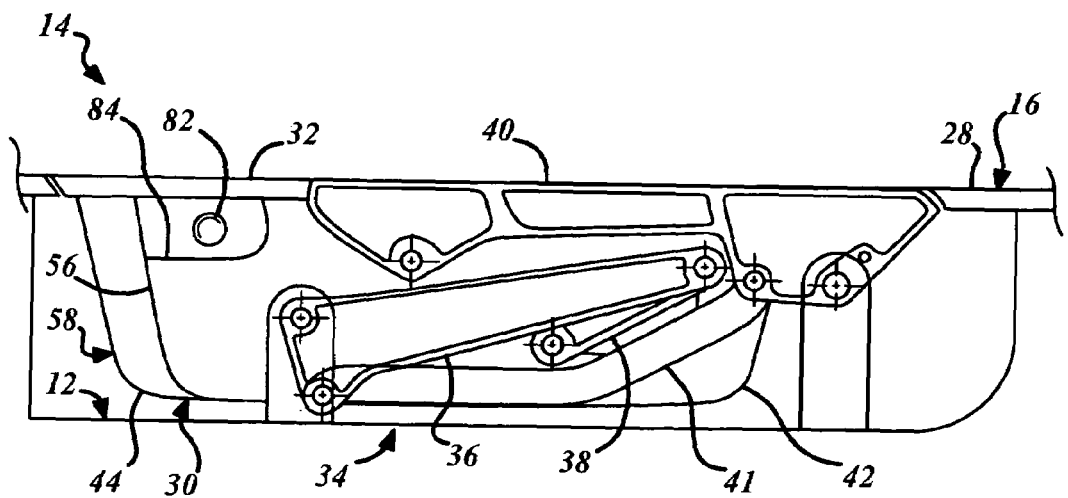
Figure 6:
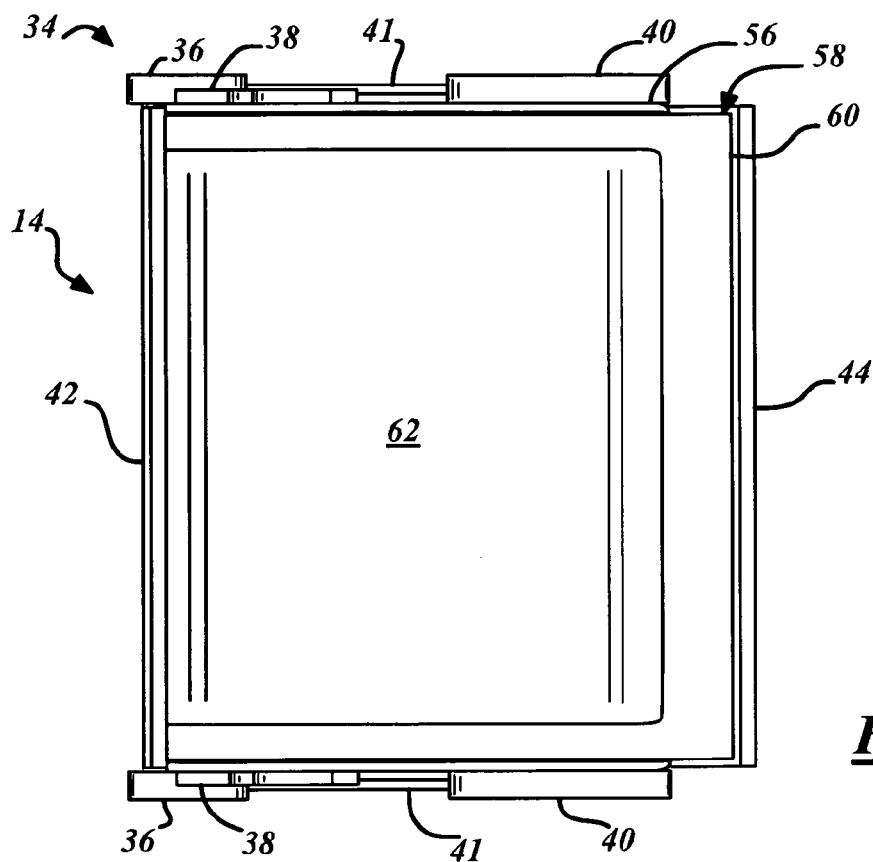
FIG. 6 is a top plan view of the ottoman shown in FIGS. 1 through 4.

In deploying the ottoman 14 above the opening 16, as best shown in FIGS. 5A and 5B, the motor 46 pivots the primary linkages 36 forward along the longitudinal axis 24 of the vehicle 12. In doing so, the primary linkages 36 move the idler linkages 40 rearward along the longitudinal axis 24 of the vehicle 12. The primary linkages 36 also move the intermediate linkages 38 and the cushion member 30 upward along the vertical axis 22 of the vehicle 12 until intermediate linkages 38 contact hard stops 39. It will be appreciated that hard stops 39 stabilize ottoman 14 in the deployed position. The cushion member 30 thus further pivots the idler linkages 40 rearward along the longitudinal axis 24 until the cushion member 30 is rotated by about 140 degrees. The cushion member 30 can be rotated by a variety of suitable angles.

In stowing the ottoman 14, the motor 46 pivots the primary linkages 36 rearward along the longitudinal axis 24. In that way, the primary linkages 36 pivot the idler linkages 40 forward along the longitudinal axis 24. Also, the primary linkages 36 pull the intermediate linkages 38 and the cushion member 30 downward along the vertical axis 22. Accordingly, the cushion member 30 further pivots the idler linkages 40 forward along the longitudinal axis 24.

In this embodiment, the cushion member 30 includes a tray 56 and a padded member 58, which is slidably attached to the tray 56. In that respect, the padded member 58 is movable between the forward and rearward deployed positions (shown in FIGS. 3 and 4). Specifically, as shown in FIGS. 7 through 9, the padded member 58 is comprised of a U-shaped base 60 and a deformable foam material 62. The U-shaped base 60 is slidably attached to the tray 56 by four pairs of opposing C-section rails 64, 66. Each pair of rails 64, 66 includes a male rail 68 and a female rail 70 with a series of ball bearings 72 therebetween. The male rail 68 of the first pair of rails 66 is welded or otherwise attached to the female rail 70 of the second pair of rails 68. Accordingly, the U-shaped base 60 and the deformable foam material 62 are easily extended and retracted a predetermined distance between the forward and rearward deployed positions.

Figure 10:
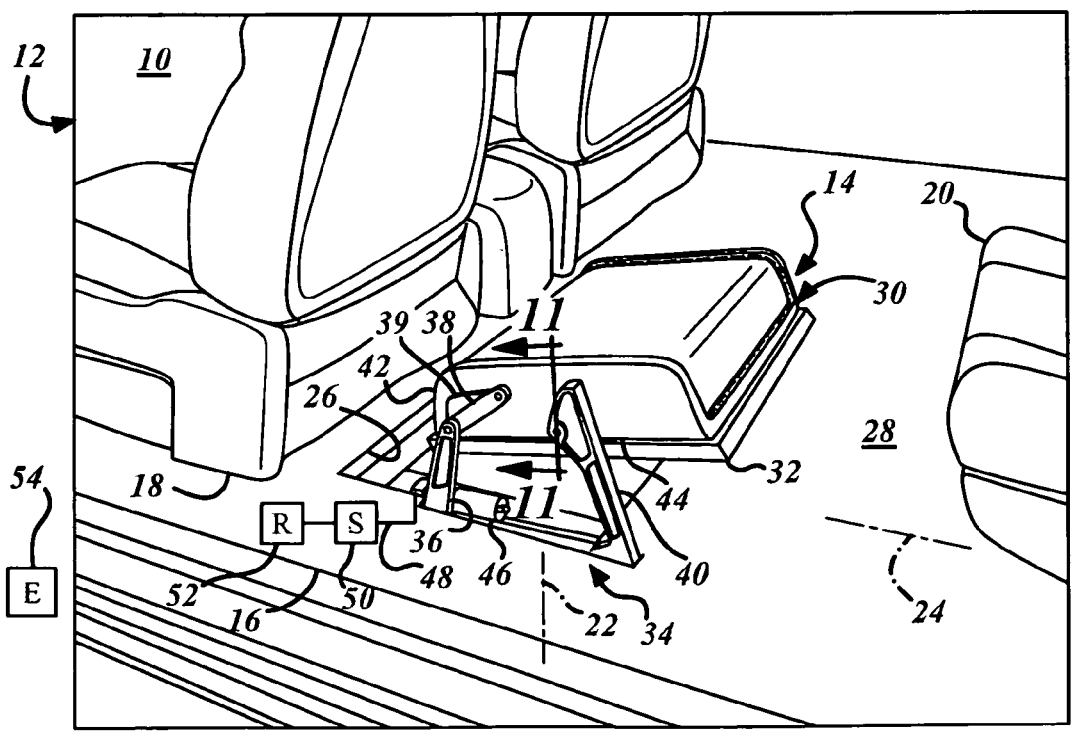
FIG. 10 is a perspective view of the passenger cabin with a stowable ottoman in a deployed position, according to an alternative embodiment of the claimed invention.
Figure 11:
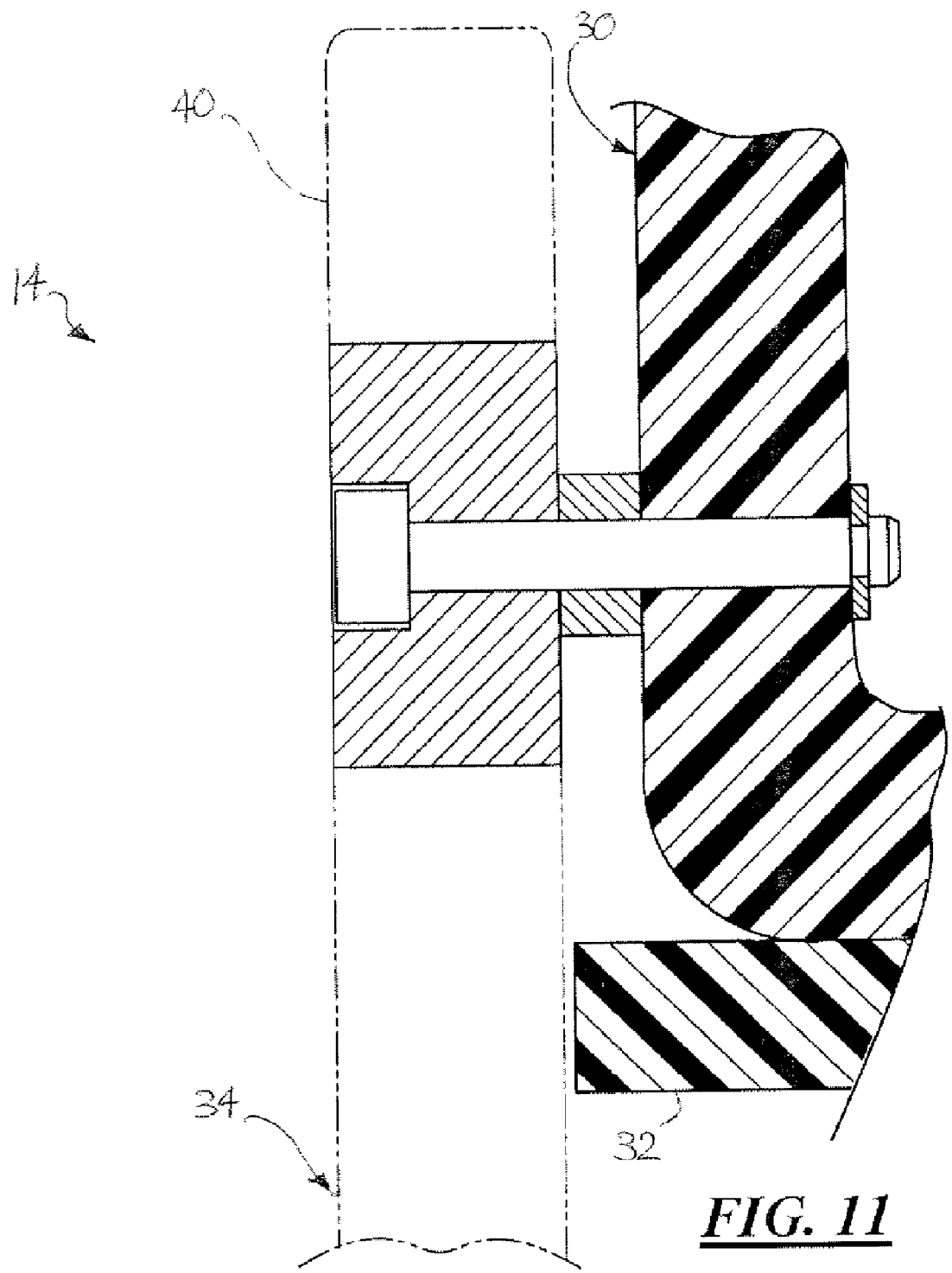
FIG. 11 is a cross-sectional view of the ottoman shown in FIG. 10 as taken along line 11-11.

It is contemplated that the U-shaped base 60 can be slidably attached to the tray 56 by more or less than four pairs of rails or by other suitable fastening devices. It will also be appreciated that the cushion member 30 can be a one-piece construction (as shown in FIGS. 10 and 11) and be comprised of various deformable materials or a rigid material as desired.

Referring back to FIGS. 8 and 9, the cushion member 30 includes a detent mechanism for locking the padded member 58 in the forward and rearward deployed positions. Namely, the U-shaped base 60 has an elongated plate 74 with a series of holes 76 therein. These holes 76 receive a detent bolt member 78, which is slidably attached to the tray 56, so as to lock the padded member 58 in position. A biasing member 80, e.g. a helical spring, is positioned between the detent bolt member 78 and the tray 56 for moving the detent bolt member 78 into the holes 76 in the elongated plate 74. The detent bolt member 78 has a knob 82 extending therefrom, which may be pulled to remove the detent member 78 from the hole 76 in the elongated plate 74. Thus, the knob 82 releases the padded member 58 from its locked position relative to the tray 56. Also, in this embodiment, the detent bolt member 78 is slidably attached to a recessed portion 84 of the tray 56. This feature is beneficial for preventing the knob 82 from contacting the floor panel 16 and impeding movement of the ottoman 14 between the stowed and deployed positions.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims.

What is claimed is:

1. A passenger cabin for a vehicle, comprising:
    a floor panel defining an opening;
    a cushion member pivotally attached to said vehicle;
    said cushion member moved substantially along a vertical axis of said vehicle between a stowed position and a deployed position, with said cushion member being pivotally attached to said vehicle by a linkage assembly and a hard stop structure extending from said cushion member;
    said cushion member in said deployed position disposed above said opening along said vertical axis, and
    wherein said linkage assembly is comprised of:
    a pair of primary linkages;
    a pair of intermediate linkages;
    said pair of primary linkages and said pair of intermediate linkages in serial connection between said vehicle and a front portion of said cushion member; and
    a pair of idler linkages in connection between said vehicle and a rear end portion of said cushion member.

2. The passenger cabin recited in claim 1 wherein said pair of primary linkages and said pair of intermediate linkages are substantially retracted into said opening and beneath said floor panel when said cushion member is in said stowed position.

3. The passenger cabin recited in claim 2 wherein said pair of primary linkages and said pair of intermediate linkages are substantially extended above said opening when said cushion member is in said deployed position.

4. The passenger cabin recited in claim 2 wherein said pair of primary linkages pivots rearward along a longitudinal axis of said vehicle when said cushion member is moved to said stowed position.

5. The passenger cabin recited in claim 2 wherein said pair of idler linkages pivots forward along a longitudinal axis of said vehicle when said cushion member is moved to said stowed position.

6. The passenger cabin recited in claim 2 wherein said pair of idler linkages is substantially flush with said floor panel when said cushion member is in said stowed position.

7. The passenger cabin recited in claim 2 wherein said pair of idler linkages are disposed above said pair of primary linkages and said pair of intermediate linkages when said cushion member is in said stowed position.

8. The passenger cabin recited in claim 1 wherein at least one of said primary linkages is pivoted by a motor.

9. A passenger cabin for a vehicle, comprising:
    a floor panel;
    a first row seat attached to said floor panel;
    a second row seat attached to said floor panel behind said first row seat along a longitudinal axis of said vehicle; and
    a stowable ottoman between said first row seat and said second row seat, wherein said stowable ottoman comprises:
    a cushion member comprised of a tray and a padded member;
    said tray pivotally attached to said vehicle;
    said padded member slidably attached to said tray;
    said padded member moved between said first deployed position and said second deployed position, wherein said padded member is slidably attached to said tray by at least one pair of opposing rail members with a series of ball bearings therebetween;
    said stowable ottoman pivotally attached to said vehicle and deployable from underneath said floor panel through an opening in said floor panel;
    said stowable ottoman slidable toward said second row seat, with said passenger cabin further comprising:
    an elongated plate attached to said padded member;
    said elongated plate defining a series of holes;
    a detent bolt member slidably attached to said tray; and
    a biasing member moving said detent bolt member into said series of holes and locking said padded member in said second deployed position.

10. The passenger cabin recited in claim 9 wherein said stowable ottoman is movable to a stowed position, a forward deployed position above said opening in said floor panel, and a rearward deployed position closer to said second row seat than said first deployed position.

11. The passenger cabin recited in claim 9 further comprising:
    a linkage assembly pivotally attached to said tray and said vehicle;
    said linkage assembly moving said tray and said padded member along a vertical axis between said stowed position and said forward deployed position;
    a motor rotating said linkage assembly;
    a switch operating said motor;
    a vehicle receiver receiving a signal from a key fob emitter to close said switch and deploy said stowable ottoman.

* * * * *